Oct. 14, 1924.

H. C. SCHAPER 1,511,428

DOUBLE READING WEIGHING MECHANISM

Filed Sept. 17, 1923   2 Sheets-Sheet 2

Inventor
Harry C. Schaper
By Cornwall, Bedell & Janne
Attys.

Patented Oct. 14, 1924.

1,511,428

UNITED STATES PATENT OFFICE.

HARRY C. SCHAPER, OF ST. LOUIS, MISSOURI, ASSIGNOR TO THE GENERAL AUTOMATIC SCALE COMPANY, OF ST. LOUIS, MISSOURI, A CORPORATION OF MISSOURI.

DOUBLE-READING WEIGHING MECHANISM.

Application filed September 17, 1923. Serial No. 663,314.

*To all whom it may concern:*

Be it known that I, HARRY C. SCHAPER, a citizen of the United States, residing at St. Louis, Missouri, have invented a certain new and useful Improvement in Double-Reading Weighing Mechanism, of which the following is a specification, such as will enable others skilled in the art to which it appertains to make and use the same.

This invention relates generally to weight indicating scales and more particularly to the type of scales disclosed in United States Letters Patent No. 1,402,970, granted to me January 10, 1922.

The objects of the invention are to provide a weighing scale in which the weight indicating marks are visible simultaneously at more than one point so as to enable a person or persons to read the scale from a number of positions.

Further objects of the invention are to provide a moving part of the scale with a plurality of weight indicia bearing members whereby said weight indicia may be projected simultaneously upon a plurality of screens.

Still further objects of the invention are to provide a source of light and a housing therefor, said source of light being arranged in optical axes with a plurality of projecting means arranged on the opposite walls of said housing in cooperation with a corresponding number of transparent members provided with weight indicating marks and operable in accordance with the load placed on the scale.

With these and other objects in view my invention consists in certain novel features of construction and arrangement of parts, hereinafter more fully described and claimed, and illustrated in the accompanying drawings, in which—

Figure 1:
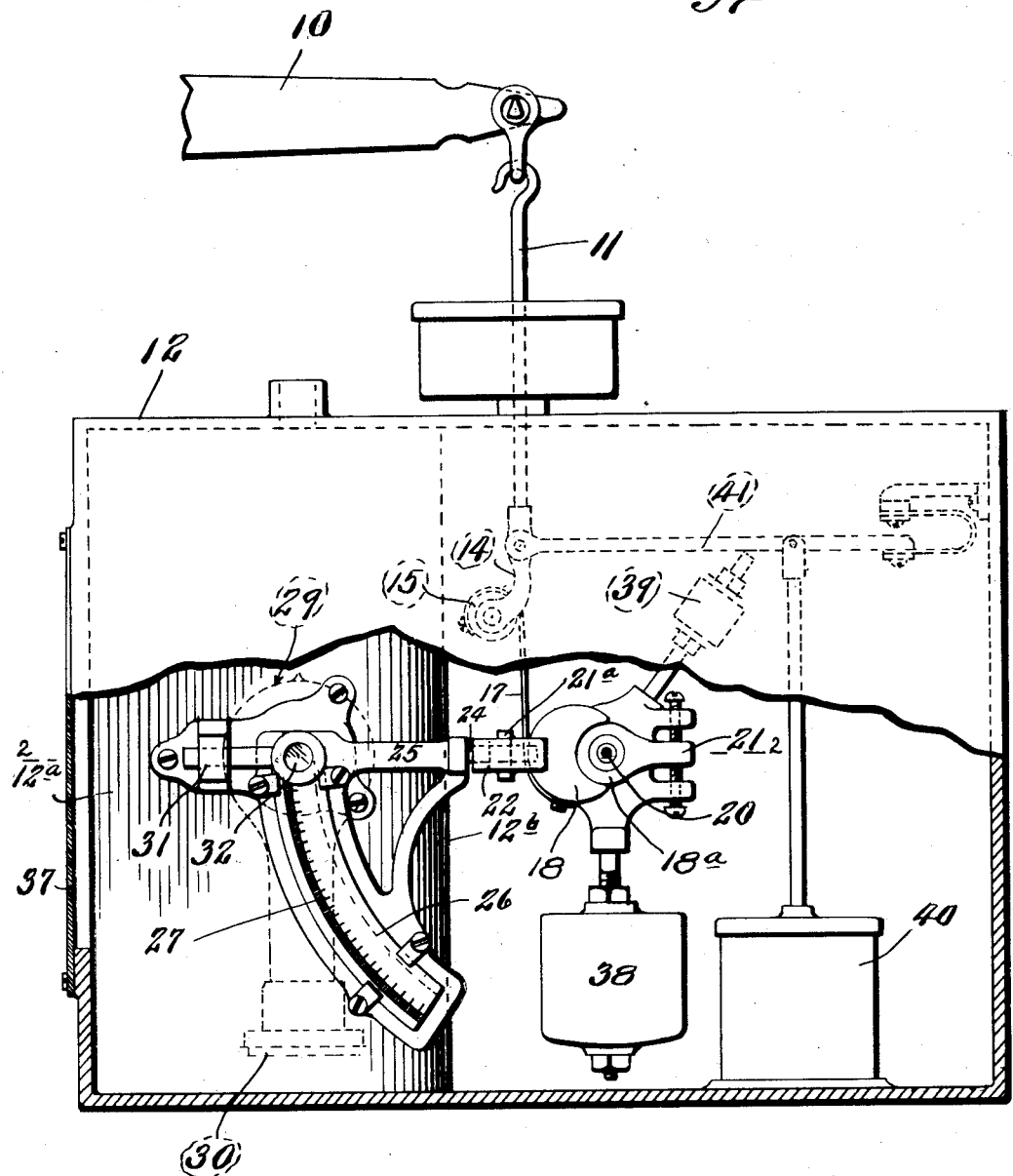
Figure 1 is a front elevation partly in section of the double reading weight indicating device.
Figure 2:
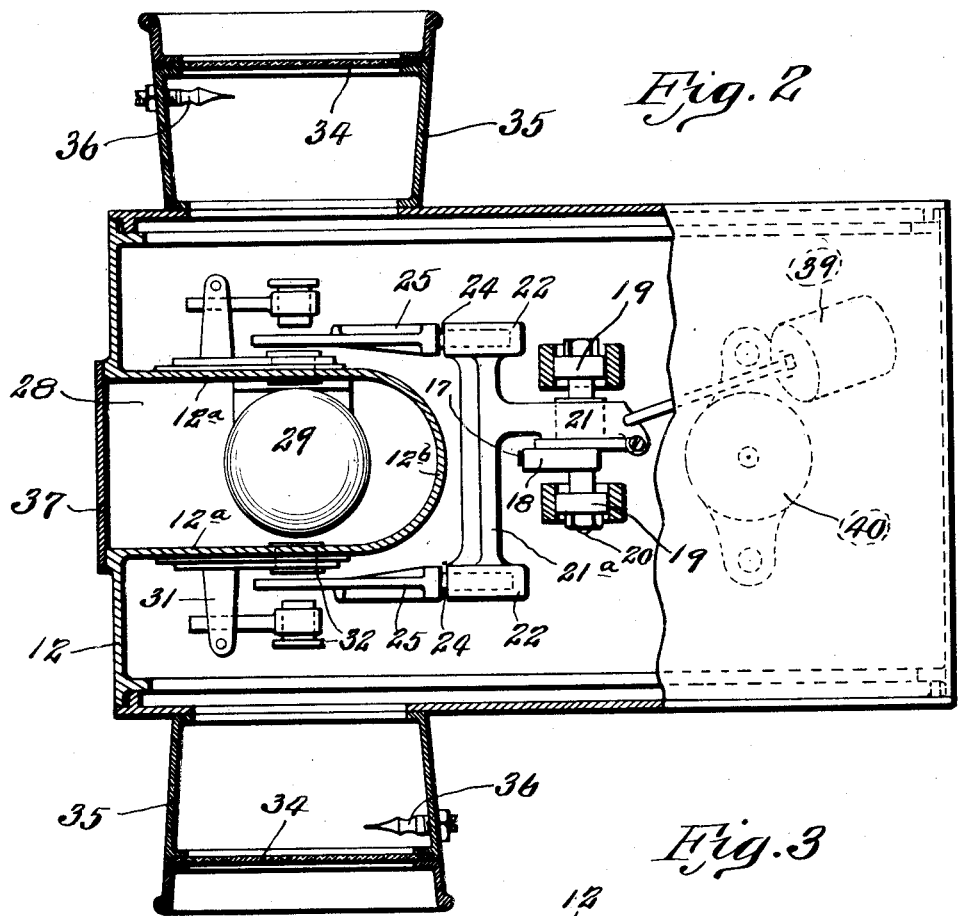
Figure 2 is a horizontal cross section taken on line 2—2 of Figure 1.
Figure 3:
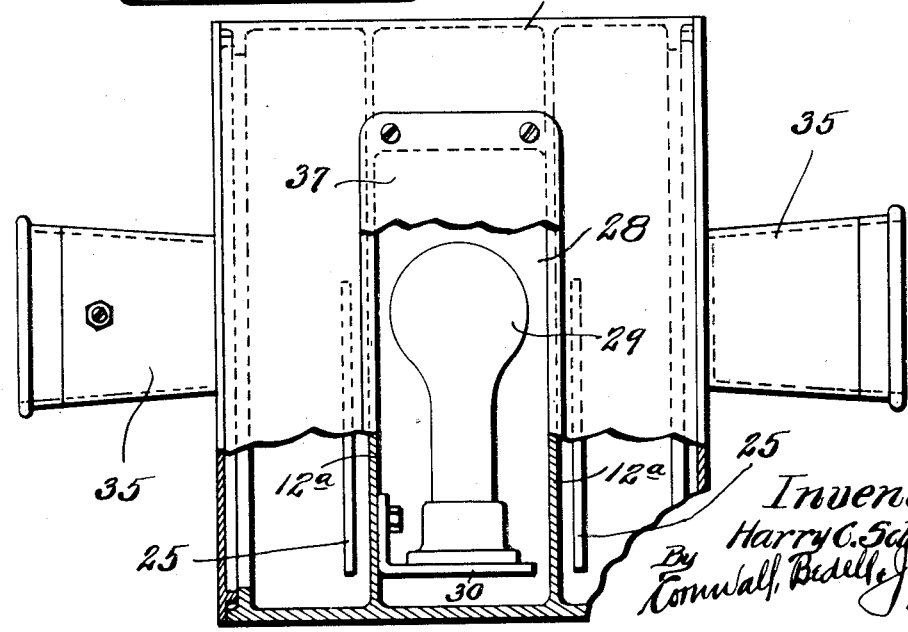
Figure 3 is an end elevation partly in cross section.

Referring by numerals to the accompanying drawings, 10 indicates a beam of a scale to which is connected the upper end of a rod 11. The lower end of this rod extends into a housing 12 and carries a bracket 14 which carries a disk 15 and has connected thereto one end of a flexible connection 17. The opposite end of this flexible connection is secured to the periphery of an eccentrically shaped member 18 carried by anti-friction bearings 19 which are mounted on shaft 20, the latter being journaled in suitable bearings arranged in said housing. Eccentric member 18 has a sleeve extension $18^a$ on which is adjustably mounted a member 21 carrying on its front forward end a horizontally disposed cross head $21^a$, the ends of which terminate in socket members 22. The socket members are spaced a suitable distance from each other and are adapted to adjustably receive the stems 24 of arms 25. Arms 25 extend forwardly and carry arcuate members 26 formed of transparent material and provided with weight indicia or indicating marks 27. These transparent members 26 are disposed adjacent to the side walls $12^a$ which are disposed vertically in housing 12 and are united at their inner ends by a semi-circular wall $12^b$.

A compartment 28 is thus formed within housing 12 and arranged in said compartment is a suitable source of light, such as an electric lamp 29, which is adjustably supported thereon by means of a bracket 30. Brackets 31 are arranged exteriorly on walls $12^a$ and carry suitable projecting means 32 which receive the light rays from lamp 29 through suitable openings formed in side walls $12^a$ and project the weight indicia 27 in an enlarged form onto a translucent screen 34 arranged in a hood or extension housing 35 and spaced a suitable distance from the corresponding weight indicia member 26.

A pointer 36 is stationarily mounted in one of the walls of hood 35 adjacent to the inner face of screen 34 and is adapted to be projected onto said screen to designate the proper weight indicating mark. The access to the light compartment 28 is provided through an opening in the front wall of housing 12 and said opening is normally closed by a closure member 37.

A pendulum weight 38 extends downwardly from member 31 and serves to restore the weight indicia members to their zero or normal positions. A counterbalancing weight 39 is also carried by member 21 and is adjustable so as to properly position the weight indicia members. A dash-pot 40 is connected by a lever 41 to bracket 14 and serves to eliminate sudden jars and vibration.

When a load is placed on the platform of a scale, beam 10 is actuated causing member 21 to be rocked on its axis so that arms 25 are oscillated simultaneously and the weight indicia members 26 move upwardly a suitable distance in accordance with the load placed on the load receiving platform. The weight indicating marks thus positioned in the optical axes of the projecting means 32 are projected thereby onto the screens 34 so that the scale may be read from opposite sides. When the load is removed from the platform, beam 10 returns to its normal position and member 21, by virtue of pendulum 38, restores arms 25 and weight indicia members 26 to their zero or normal positions.

I claim:

1. In a weight indicator for scales, the combination with a load actuated member, of a pendulum member operable thereby in one direction and by gravity in an opposite direction, a pair of spaced weight indicia members carried by said pendulum member, projecting means including a source of light cooperating with said weight indicia members for projecting the weight indicia thereof, and screens arranged in optical axes with said projecting means for receiving the projected indicia in enlarged forms.

2. A double reading weight indicator for scales comprising in combination with the scale beam, of a housing, a balanced member pivotally supported in said housing, a light compartment in said housing, a pair of spaced weight indicia members carried by said balanced member and disposed adjacent to the side walls of said light compartment, a source of light in said light compartment, projecting means arranged on the side walls of said light compartment, there being suitable openings formed in each side wall in optical axis with the corresponding projecting means, and translucent screens arranged on said housing in spaced relation with said projecting means and adapted to receive in enlarged forms the weight indicia projected by said projecting means.

3. In a double reading weight indicator for scales, the combination with a load actuated member, of a housing, a member pivotally supported therein and provided with a pair of spaced socket members, an arcuate arm adjustably supported in each socket member, a transparent member arranged on each arm and provided with weight indicia, a light compartment in said housing, a source of light arranged therein, projecting means arranged in cooperative relation with each weight indicia member and with said source of light, and a pair of translucent screens supported by said housing in spaced relation with said weight indicia members and in optical axes with the respective projecting means for receiving the projected weight indicia in enlarged forms.

4. In a weight indicator for scales, the combination with a pivotal member adapted to be actuated in accordance with a load placed on a scale, of an extension secured to said member and provided with a pair of spaced parallel disposed socket members, an arm adjustably carried by each socket member, a transparent member provided with weight indicating marks mounted on each arm, a translucent screen arranged in spaced optical relation with each weight indicating member, and projecting means including a source of light arranged in cooperative relation with each transparent weight indicating member for projecting the weight indicating marks thereof in an enlarged form on the corresponding screen.

5. In a weight indicator for scales, the combination with a pivotal member adapted to be actuated in accordance with a load placed on a scale, of an extension secured to said member and provided with a pair of spaced parallel disposed socket members, an arm adjustably carried by each socket member, a transparent member provided with weight indicating marks mounted on each arm, a translucent screen arranged in spaced optical relation with each weight indicating member, projecting means including a source of light arranged in cooperative relation with each transparent weight indicating member for projecting the weight indicating marks thereof in an enlarged form on the corresponding screen, and a fixed means arranged in correlation with each translucent screen for designating the proper weight indicating mark projected thereon.

6. A double reading weight indicating device for scales comprising in combination with a load actuated member, of a pivotally mounted member, arcuate arms adjustably carried by said pivotal member, a weight indicia member arranged on each arm, a pair of translucent screens arranged in spaced relation with said weight indicia members, a source of light, projecting means arranged on the opposite sides of said source of light in cooperative relation with the respective weight indicia members and adapted to project the weight indicia of the respective members in opposite directions, and a pair of oppositely disposed translucent screens adapted to receive the projected images of said weight indicia in enlarged forms.

In testimony whereof I hereunto affix my signature this 11th day of September, 1923.

HARRY C. SCHAPER.